United States Patent Office 3,128,199
Patented Apr. 7, 1964

3,128,199
STABILIZATION OF WOOD AGAINST
ULTRAVIOLET LIGHT
Roland S. Foster, Lake Jackson, Tex., assignor to The
Dow Chemical Company, Midland, Mich., a corporation of Delaware
No Drawing. Filed Dec. 14, 1960, Ser. No. 75,688
9 Claims. (Cl. 117—33.3)

This invention relates to a method for stabilizing wood against damage caused by exposure to ultraviolet light and to wood so stabilized.

The process of the invention is shown diagrammatically by the following flow-sheet:

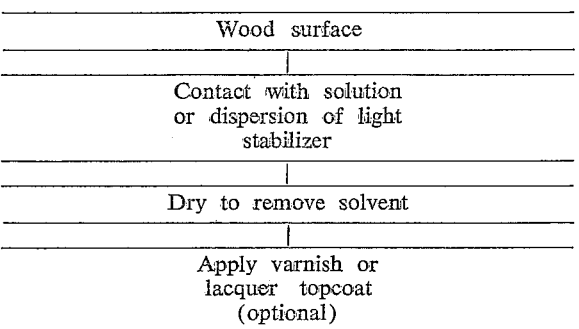

Ultraviolet radiation, such as that present in sunlight, is known to damage exposed wood surfaces by attacking the lignin in the wood, breaking down the structure of the lignin and leaving it vulnerable to oxidation and other secondary reactions. This is the start of the complex process known as weathering, in the course of which the wood becomes darkened and discolored, and the physical structure of the wood surface deteriorates as the lignin is decomposed and removed from the wood substance by the action of the elements.

In the past, wood has been protected against such damage by covering it with opaque paints, thus preventing light from reaching the surface, or by coating it with a transparent varnish, lacquer, or the like containing a substance capable of selectively absorbing the harmful wavelengths of ultraviolet light. While this last method is somewhat effective in preserving the appearance of the wood grain and retarding its darkening from exposure to sunlight, it has disadvantageous limitations. The necessary thinness of such a coating precludes the possibility of having a light screen of significant cross-section, the screen therefore being of only moderate efficiency. In addition, ultraviolet light-absorbing compounds are known to promote the rupture of polymer chains in an organic coating, and thus accelerate film breakdown, by the transfer of absorbed energy to the closely adjacent polymer molecules. This effect makes it necessary to hold the light-absorber concentration in a coating to a minimum, preventing the use of a more effective amount.

I have discovered that the above-mentioned disadvantages are largely avoided, and improved color stability and protection are imparted to natural or unfinished wood surfaces by applying directly to the wood surface a light-absorbing composition as a dilute solution in a volatile solvent. Applied thus as a dilute solution, the light absorber penetrates the wood surface to a significant depth, giving a sizable cross-section available for ultraviolet light absorption. Being so dispersed, the light absorbing properties of the composition are thereby more effectively utilized than was heretofore possible.

After evaporation of substantially all of the solvent, the wood surface may be finished as desired, for example, by covering it with an adherent transparent protective coating such as a varnish, lacquer, wax, or the like. This method of protecting wood is in contrast to the prior techniques wherein a wood surface is coated with varnish containing a light-absorber so that the resinous content of the varnish and the contained light absorber remain on the wood surface and there is no significant penetration of the wood by the viscous varnish composition.

By my invention, light-absorbing compounds may be applied in much higher concentration than has been possible in the past, and correspondingly more effective protection for longer periods of time is thereby obtainable. As a further advantage of my invention, the light-absorber is within the surface structure of the wood itself, rather than lying above the surface dispersed in a thin coating, and therefore more efficiently protects a varnished or similarly adherent-coated wood surface at the wood-varnish interface, thereby making possible longer-lived adhesion and consequently lengthening the service life of the varnish or other coating. Varnishes are known to erode with the passage of time and this erosion removes the contained light-absorber along with the varnish when the prior art technique is used. Such erosion cannot affect light stabilizer applied by my new process.

While my discovery may be found most useful in the prevention of darkening and surface deterioration of the lighter colored woods, the naturally darker woods are also better protected against discoloration and surface deterioration by its use. By the term wood is meant not only solid wood itself, but also wood products consisting largely of wood or wood fibers such as hardboard, chip board, pasteboard, cardboard, paperboard, and paper, all of which are also subject to discoloration and loss of physical properties on exposure to ultraviolet light.

Compounds useful in my invention are known light stabilizers capable of selectively absorbing the harmful ultraviolet light. Representative of these are aromatic carbonyl compounds having a hydroxyl group on the aromatic ring ortho to the carbonyl group. Among such are various salicylate esters, monohydroxy or polyhydroxy aromatic ketones such as hydroxylated acetophenones, propiophenones, benzophenones, naphthophenones, and related compounds such as benzoylated resorcinols and their esters and ethers. Aliphatic carbonyl compounds also known to have ultraviolet light absorbing properties are certain citrate esters and diketones such as oleoylacetone. In some applications of my new process, more favorable results may be obtained by using mixtures of two or more known light stabilizers.

The amount of ultraviolet light absorbing compound to be applied to the food surface depends upon the compounds used, the wood surface, and the ultraviolet light protection needed. When using dibenzoylresorcinol as the ultraviolet light absorber on white pine and spruce as set forth in Example 1, retentions of 0.3–1.0 gram per square foot were found to be effective.

Any volatile solvent capable of dissolving sufficient light absorber and inert toward it and the wood surface may be used. Volatile organic solvents such as alcohol, acetone, methyl ethyl ketone, methyl acetate, or a low boiling petroleum fraction are suitable. In some cases, a water dispersion may be preferred. These solutions or dispersions may be applied to a wood surface by any of the commonly known methods for doing so such as brushing, rolling, spraying, or soaking. The solvent is removed in substantial entirety, ordinarily by air drying. Following the drying step, protective coatings may be applied as desired.

Examples 1 and 2 illustrate some of the many ways in which my invention may be used.

Example 1

Test panels 2½ x 6½ inches in size were cut from selected white pine and spruce boards. The panels were sanded smooth and numbered. Three panels of pine and three of spruce were used for each of the following treatments:

T₁—2 coats linseed-alkyd varnish;
T₂—1 coat 5% dibenzoylresorcinol in methyl ethyl ketone (0.30 g. DBR per sq. ft.) then 2 coats linseed-alkyd varnish;
T₃—1 coat 10% DBR solution (0.49 g. DBR per sq. ft.), then 2 coats linseed-alkyd varnish;

The letters DBR are used in this application to mean dibenzoylresorcinol, commercially available as a mixture of the 2,4- and 4,6-isomers.

T₄—2 coats 10% DBR solution (1.04 g. DBR per sq. ft.), then 2 coats linseed-alkyd varnish;
T₅—2 coats linseed-alkyd varnish containing 2.5% DBR based on resin solids (0.15 g. DBR per sq. ft.).

Treatments were applied by brush. After the thirty treated panels had dried for several days, they were exposed for 300 hours to ultraviolet light in a Model BLTS–X Atlas Weather-O-Meter using a 50 minute dry–10 minute wet cycle, an intermittent water spray doing the wetting. Film integrity was graded visually by two observers with a rating of 100 as perfect, 90 indicating mild checking, 80 slight cracking, and so on down to 50 which indicates severe cracking of the protective film and wood. Darkening was measured by a photoelectric cell which sensed light diffusely reflected from the test panels. A constant intensity incandescent lamp was used to illuminate the panels for this test. Measurements were made with a flat black panel as a dark standard and an unexposed varnished spruce panel as a light standard. Readings are in microamperes, the light standard panel reading at 46.5, the dark at 5.8. All values listed are averages for the panels given a particular treatment, there being no significant difference between the values for spruce and pine panels.

| Panel Treatment | Reflectance Reading | Relative Film Integrity |
|---|---|---|
| T₁ | 19.0 | 64.7 |
| T₂ | 23.3 | 75.3 |
| T₃ | 25.1 | 80.9 |
| T₄ | 26.7 | 89.4 |
| T₅ | 22.9 | 63.3 |

As shown by the above figures, treatment T₄ gave the best results with treatment T₃ being a close second. All these panels from T₄ and T₃ were light yellow in color and relatively free of brown streaks and cracks in the coating. Panels given treatments T₂ and T₅, having light absorber in the wood and in the varnish coating respectively, were yellow to tan, the panels given treatments T₅ having considerably more cracking of the coating. The panels given treatment T₁ were brown with dark brown streaks and there was considerable cracking of the varnish coating.

Example 2

A diagonal section of a birch plywood door was treated with one coat of a 5% dibenzoylresorcinol solution in methyl ethyl ketone and then covered with two coats of an epoxy ester varnish. An adjacent diagonal section of the same door was given two coats of the epoxy ester varnish only. After one year's southeast exposure on the Texas Gulf coast, the diagonal section treated with DBR was a uniform light yellow in color with the coating surface substantially intact and smooth. The section treated only with varnish was discolored with brown blotches and streaks, and the varnish surface was badly checked and starting to disintegrate in places.

Although the preceding description and examples are directed only to the impregnation of wood and wood products with an ultraviolet light stabilizing composition, it is to be understood that other protective materials may be incorporated in the impregnating composition. For example, the light stabilizer may be combined in a solution with a fungicide such as pentachlorophenol, and wood impregnated with the mixed solution may thereby be afforded protection by one treatment against damage both by ultraviolet light and by fungi.

I claim:

1. A process for protecting a wood surface from damage caused by ultraviolet light which comprises impregnating said wood surface with an effective amount of a substance selected from the group consisting of salicylate esters, ortho hydroxylated aromatic ketones, and mixtures thereof.

2. A process for protecting a wood surface from damage caused by ultraviolet light which comprises impregnating said wood surface with a composition comprising a volatile solvent and a substance selected from the group consisting of salicylate esters, ortho hydroxylated aromatic ketones, and mixtures thereof.

3. A process for protecting a wood surface from damage caused by ultraviolet light which comprises impregnating said wood surface with a composition comprising a volatile solvent and a substance selected from the group consisting of salicylate esters, ortho hydroxylated aromatic ketones, and mixtures thereof, drying said wood surface to remove substantially all the solvent, and thereafter covering the impregnated wood surface with an adherent transparent protective finish.

4. Ultraviolet light-stabilized wood having the surface impregnated with an effective amount of a substance selected from the group consisting of salicylate esters, ortho hydroxylated aromatic ketones, and mixtures thereof.

5. Ultraviolet light-stabilized wood having the surface impregnated with an effective amount of a substance selected from the group consisting of salicylate esters, ortho hydroxylated aromatic ketones, and mixtures thereof, said impregnated wood surface being additionally covered by an adherent transparent protective finish.

6. A process for protecting a wood surface from damage caused by exposure to ultraviolet light which comprises impregnating said wood surface with an effective amount of dibenzoylresorcinol.

7. A process for protecting a wood surface from damage caused by exposure to ultraviolet light which comprises impregnating said surface with a solution of dibenzoylresorcinol in a volatile solvent, drying the impregnated surface to remove substantially all the solvent, and coating the impregnated and dried surface with an adherent transparent protective finish.

8. Wood stabilized against the harmful effects of ultraviolet light, said wood having the surface impregnated with an effective amount of dibenzoylresorcinol.

9. Wood stabilized as described in claim 8, the impregnated surface being additionally coated by an adherent transparent protective finish.

References Cited in the file of this patent

UNITED STATES PATENTS

| 1,753,616 | Mougey | Apr. 8, 1930 |
| 1,920,483 | Senftner | Aug. 1, 1933 |
| 2,876,210 | Wynn et al. | Mar. 3, 1959 |
| 2,955,958 | Brown | Oct. 11, 1960 |
| 2,970,066 | Brasure | Jan. 31, 1961 |
| 3,055,896 | Boyle et al. | Sept. 25, 1962 |